United States Patent
John et al.

(10) Patent No.: US 9,924,483 B2
(45) Date of Patent: Mar. 20, 2018

(54) SYSTEMS AND METHODS FOR SIGNAL BROKERING IN DISTRIBUTED EVOLVED PACKET CORE (EPC) NETWORK ARCHITECTURES

(71) Applicant: Futurewei Technologies, Inc., Plano, TX (US)

(72) Inventors: Kaippallimalil Mathew John, Richardson, TX (US); Zhixian Xiang, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 170 days.

(21) Appl. No.: 14/510,980

(22) Filed: Oct. 9, 2014

(65) Prior Publication Data
US 2015/0103780 A1  Apr. 16, 2015

Related U.S. Application Data

(60) Provisional application No. 61/889,927, filed on Oct. 11, 2013.

(51) Int. Cl.
H04W 4/00 (2009.01)
H04W 60/00 (2009.01)
(Continued)

(52) U.S. Cl.
CPC ......... *H04W 60/00* (2013.01); *H04L 61/1588* (2013.01); *H04L 41/0893* (2013.01); *H04L 61/1552* (2013.01); *H04L 61/2007* (2013.01); *H04L 61/2061* (2013.01); *H04L 61/6054* (2013.01)

(58) Field of Classification Search
USPC ........................................ 370/328, 329, 331
See application file for complete search history.

(56) References Cited

U.S. PATENT DOCUMENTS 6,915,345 B1 * 7/2005 Tummala ............ H04L 63/0428
  455/432.1
2001/0032262 A1  10/2001 Sundqvist et al.
(Continued)

FOREIGN PATENT DOCUMENTS

EP  2645777 A1  10/2013

OTHER PUBLICATIONS

International Search Report and Written Opinion received in International Application No. PCT/US2014/60060 dated Jan. 13, 2015, 7 pages.
(Continued)

*Primary Examiner* — Yemane Mesfin
*Assistant Examiner* — Mon Cheri Davenport
(74) *Attorney, Agent, or Firm* — Slater Matsil, LLP

(57) ABSTRACT

Internet protocol (IP) address allocations in distributed EPC networks can be published to an IP address registry maintained at the central EPC entity in order to facilitate the routing of authentication authorization, and accounting (AAA) signaling of third party networks throughout the distributed EPC network architecture. The address allocations can be published directly to an address registry maintained by the central EPC entity, or indirectly via a cloud management server. Additionally, latencies associated with UE authentication in distributed EPC network architectures can be mitigated by triggering communication of the authentication or authorization profile upon reception of an update location request (ULR) message at the central EPC network entity.

20 Claims, 10 Drawing Sheets

(51) Int. Cl.
  *H04L 29/12* (2006.01)
  *H04L 12/24* (2006.01)

(56) References Cited

U.S. PATENT DOCUMENTS

| | | |
|---|---|---|
| 2009/0300217 A1 | 12/2009 | Patel et al. |
| 2011/0302289 A1 | 12/2011 | Shaikh et al. |
| 2013/0151845 A1* | 6/2013 | Donovan ............ H04L 63/0407 713/153 |
| 2013/0242754 A1 | 9/2013 | Shaikh et al. |
| 2014/0064188 A1* | 3/2014 | D'Souza ............... H04W 88/16 370/328 |
| 2015/0023176 A1* | 1/2015 | Korja ..................... H04L 45/42 370/236 |

OTHER PUBLICATIONS

3rd Generation Partnership Project; Technical Specification Group Services and System Aspects; General Packet Radio Service (GPRS) enhancements for Evolved Universal Terrestrial Radio Access Network (E-UTRAN) access (Release 12), 3GPP TS 23.401 V12.2.0, Sep. 2013, 293 pages.

3GPP TS 29.213 V12.4.1, "3rd Generation Partnership Project-;Technical Specification Group Core Network and Terminals; Policy and Charging Control Signalling Flows and Quality of Service (QoS) Parameter Mapping (Release 12)", Jul. 2014, 206 pages.

\* cited by examiner

SYSTEMS AND METHODS FOR SIGNAL BROKERING IN DISTRIBUTED EVOLVED PACKET CORE (EPC) NETWORK ARCHITECTURES

This patent application claims priority to U.S. Provisional Application No. 61/889,927, filed on Oct. 11, 2013 and entitled "System and Method for a Distributed Signaling Brokering Agent," which is hereby incorporated by reference herein as if reproduced in its entirety.

TECHNICAL FIELD

The present invention relates generally to telecommunications, and, in particular embodiments, to systems and methods for signal brokering in distributed evolved packet core (EPC) Network architectures.

BACKGROUND

Conventional Long Term Evolution (LTE) and Evolved Packet System (EPS) architectures utilize centralized evolved packet core (EPC) networks to anchor internet protocol (IP) sessions of the user equipments (UEs). Next generation LTE and EPS architectures will likely employ distributed EPC networks due to the increased deployment of small cells, heterogeneous networks (het-nets), machine to machine (M2M) networks, and networks of devices. Distributed EPC network architectures typically include multiple distributed EPC entities comprising gateways, as well as a centralized EPC entity that serves as an intermediary between the distributed EPC entities and external third party networks.

SUMMARY OF THE INVENTION

Technical advantages are generally achieved, by embodiments of this disclosure which describe distributed signaling brokering agents for distributed evolved packet core (EPC) networks.

In accordance with an embodiment, a method for reserving resources in distributed evolved packet core (EPC) networks is provided. In this example, the method includes receiving an authentication, authorization, and accounting (AAA) protocol request from an application server at a brokering agent in a central EPC network. The AAA protocol request specifies an internet protocol (IP) address of a user equipment (UE) as a destination address of the AAA protocol request. The method further includes searching an address registry in accordance with the IP address to determine that the IP address is associated with a first one of a plurality of distributed EPC networks, and forwarding the AAA protocol request to a distributed policy and charging rules function (PCRF) entity in the first distributed EPC network. An apparatus for performing this method is also provided.

In accordance with another embodiment, a method for fast authentication in distributed evolved packet core (EPC) networks is provided. In this example, the method includes receiving an update location request/update location answer (ULR/ULA) message from a mobility management entity (MME) in a distributed EPC network at a brokering agent in a central EPC network. The ULR/ULA message specifies an international mobile subscriber identity (IMSI) of a user equipment (UE). The method further includes triggering communication of an authentication or authorization profile associated with the IMSI to a policy and charging rules function (PCRF) entity in the distributed EPC network in response to receiving the ULR/ULA message from the MME. The authentication or authorization profile is sent to the PCRF entity without receiving a corresponding profile request from the PCRF entity. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
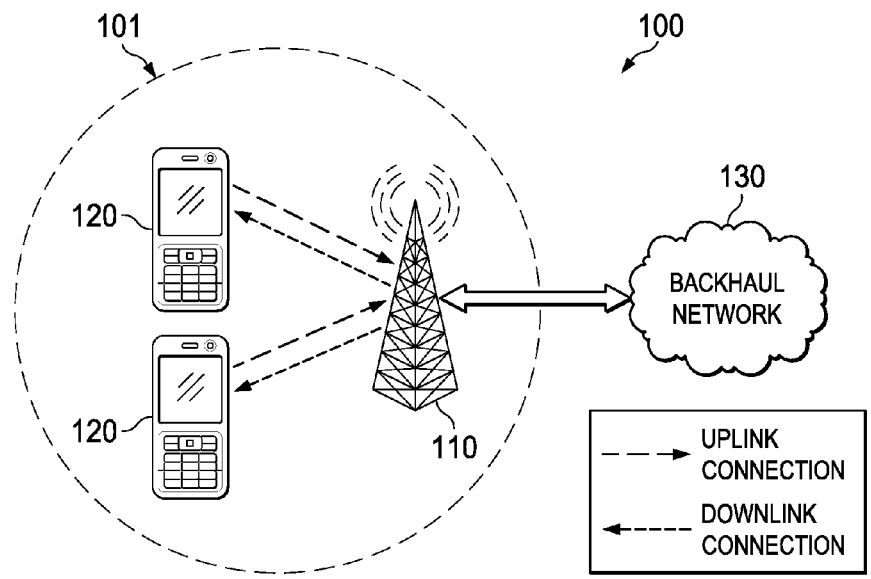
FIG. 1 illustrates a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

In EPC networks, a policy and charging rules function (PCRF) entity is responsible for making real-time policy decisions as well as accessing/maintaining subscriber databases. In centralized EPC networks, the PCRF entity maintains a central address registry that tracks IP address assignments of the gateway. The central address registry is used to route signaling received from third party networks. For example, a gateway in the central EPC network may dynamically assign an IP address to a user equipment (UE) when setting up the radio bearer. The PCRF entity in the central EPC network may then associate the IP address assignment with the RAN, which allows authentication, authorization, and accounting (AAA) requests received from third party networks to be appropriately routed to the RAN by mapping IP address carried by the AAA requests to the address registry.

One key distinction between centralized and the distributed EPC network architecture discussed herein is that this distributed EPC network architecture positions the PCRF entities and gateways at distributed EPC network locations. Traditionally, the distributed PCRF entities maintain local address registries that reflect IP address assignments made by the distributed gateways in their corresponding distributed EPC network locations. However, the local address registries in conventional distributed EPC networks do not track IP address assignments made by distributed gateways in other distributed EPC network locations, and are also not generally available to the central EPC entity. Accordingly, the central EPC entity may be unable to determine which distributed PCRF entity is associated with a destination IP address of incoming AAA requests, which makes the routing of said requests difficult (if not impossible)

Aspects of this disclosure provide techniques that publish IP address allocations in distributed EPC networks to an IP address registry maintained at the central EPC entity, which is then used to route AAA requests received from third party networks to the appropriate distributed EPC network. In an embodiment, the publication is triggered by an IP range allocation/re-allocation that allocates/reallocates ranges of IP addresses amongst distributed gateways in the distributed EPC networks. The ranges of IP address correspond to pools of address available for assignment by the corresponding distributed gateways. For example, a distributed gateway assigns addresses from that pool to a newly attached UE during link setup. In some embodiments, the address allocations are published directly to an address registry maintained by the central EPC entity. In other embodiments, the address allocations are first published to an address registry in a cloud management server, which updates the address registry at the central EPC entity.

Another potential issue in distributed EPC network architectures is that distribution of the PCRF entities adds latency to UE authentication, thereby delaying link setup. More specifically, link setup procedures usually include UE authentication at the EPC using an authentication or authorization profile stored at a subscription profile repository (SPR). In distributed EPC networks architectures, the subscription profile repository (SPR) is maintained at the central EPC network entity, and the authentication profiles are communicated from the central EPC network entity to the distributed PCRF entities upon request, e.g., upon the central EPC network entity receiving a corresponding profile request specifying the International Mobile Subscriber Identity (IMSI) of the UE. In conventional distributed EPC architectures, the profile request is communicated separately from (and after) the update location request (ULR) message, which is the message that initializes the link set-up. The time lapse between communication of the ULR and profile request messages adds latency to the UE authentication procedure, thereby delaying link setup in distributed EPC networks. Aspects of this disclosure avoid this latency by triggering communication of the authentication or authorization profile upon reception of the URL message at the central EPC network entity. These and other features are described in greater detail below.

FIG. 1 illustrates a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Figure 2:
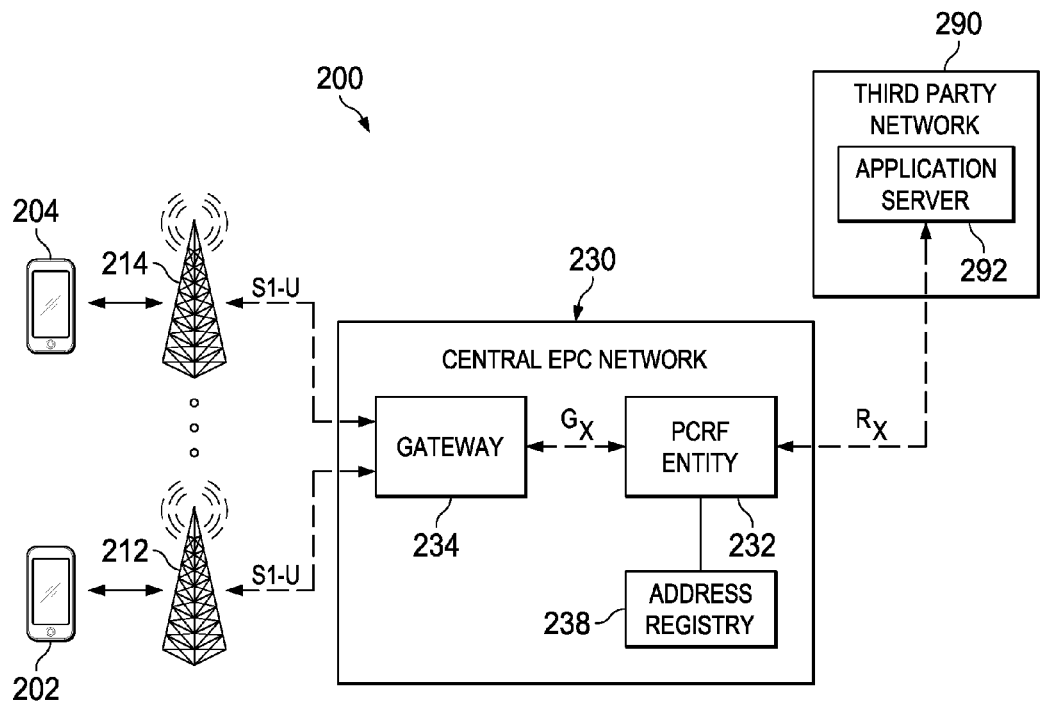
FIG. 2 illustrates a diagram of a conventional centralized EPC network architecture.

FIG. 2 illustrates a conventional centralized EPC network architecture 200 in which a gateway 234 and PCRF entity 232 in a central EPC network 230 serve as intermediaries between a third party network 290 and access points 212, 214 in radio access networks (RANs). As shown, a GX interface extends between the PCRF entity 232 and the gateway 234, and an S1-U interface extends between the gateway 234 and the access points 212, 214 in the RAN. The S1-U and GX interfaces may correspond to backhaul network. During link setup, radio interfaces (solid arrows) are established between the access points 212, 214 and the user equipments 202, 204, at which time the gateway 234 dynamically assigns IP addresses to the user equipments 202, 204. The PCRF entity 232 may maintain an address registry 238 that tracks the IP address assignments of the gateway 234, and associates specific IP addresses (or address ranges) with specific RANs and/or access points.

After link setup, the user equipment 204 may attempt to access a service provided by the application server 292 by sending an SIP invite message to the application server 292. The SIP message may include the IP address assigned to the UE 204 by the gateway 234, and may prompt the application server 292 to send a AAA request to the PCRF entity 232 over an Rx interface in order to authenticate/authorize the user equipment 204. The AAA request may specify the IP address carried by the SIP message as a destination address of the AAA request, and may be routed to the access point 214 via the gateway 234 in accordance with the address registry 238.

Figure 3:
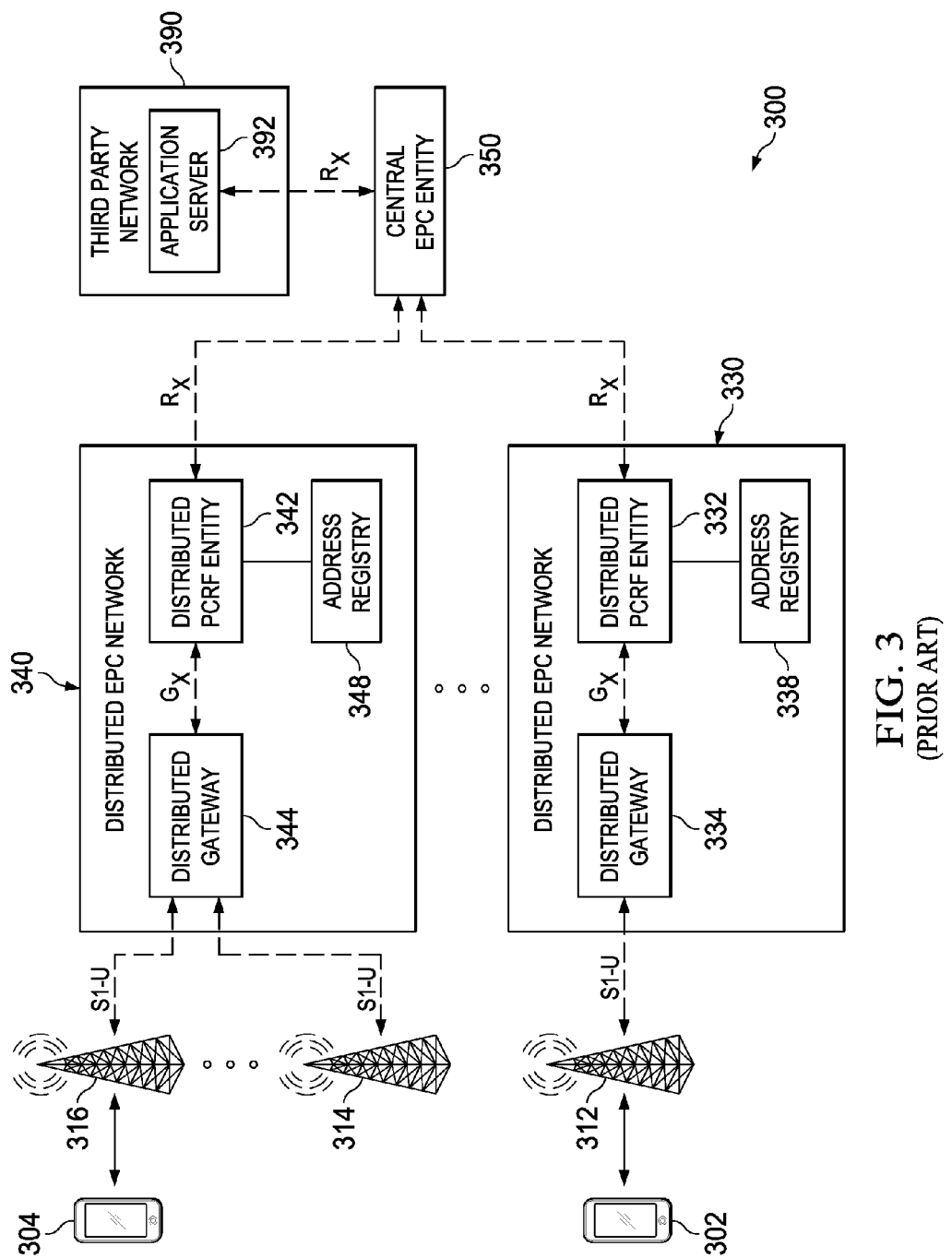
FIG. 3 illustrates a diagram of a conventional distributed EPC network architecture.

The routing of AAA requests may be difficult in conventional distributed EPC network architectures, as the address registries are maintained in the distributed EPC networks, rather than at centralized EPC network entity. FIG. 3 illustrates a conventional distributed EPC network architecture 300 in which distributed gateways 334, 344 and distributed PCRF entities 332, 334 in distributed EPC networks 330, 340 serve as intermediaries between a third party network 390 and access points 312, 314, 316 in the RAN(s). As shown, Rx interfaces extend between an application server 392 in the third party network 390 and a central EPC entity 350, as well as between the central EPC entity and the distributed PCRF entities 332, 342 in the distributed EPC networks 330, 340. The distributed PCRF entities 332, 342 and the distributed gateways 334, 344 may behave similar to the PCRF 234 and the gateway 232 in that the distributed gateways 334, 344 may assign IP addresses to the UEs 302, 304 accessing their respective RANs, and the distributed PCRF entities 332, 342 may maintain address registries 338, 348 tracking those IP address assignments.

However, the address registries 338, 348 in the conventional distributed EPC network architecture 300 are locally maintained such that the address registry 338 does not reflect IP address assignments of the distributed gateway 344, and the address registry 348 does not reflect IP address assignments of the distributed gateway 334. Moreover, in the conventional distributed EPC network architecture 300, IP address allocation information is not available to the central EPC entity 350. As a result, the central EPC entity 350 may be unable to determine which distributed EPC network 340 to route AAA requests (or other signaling) received from the third party network 390.

Figure 4:
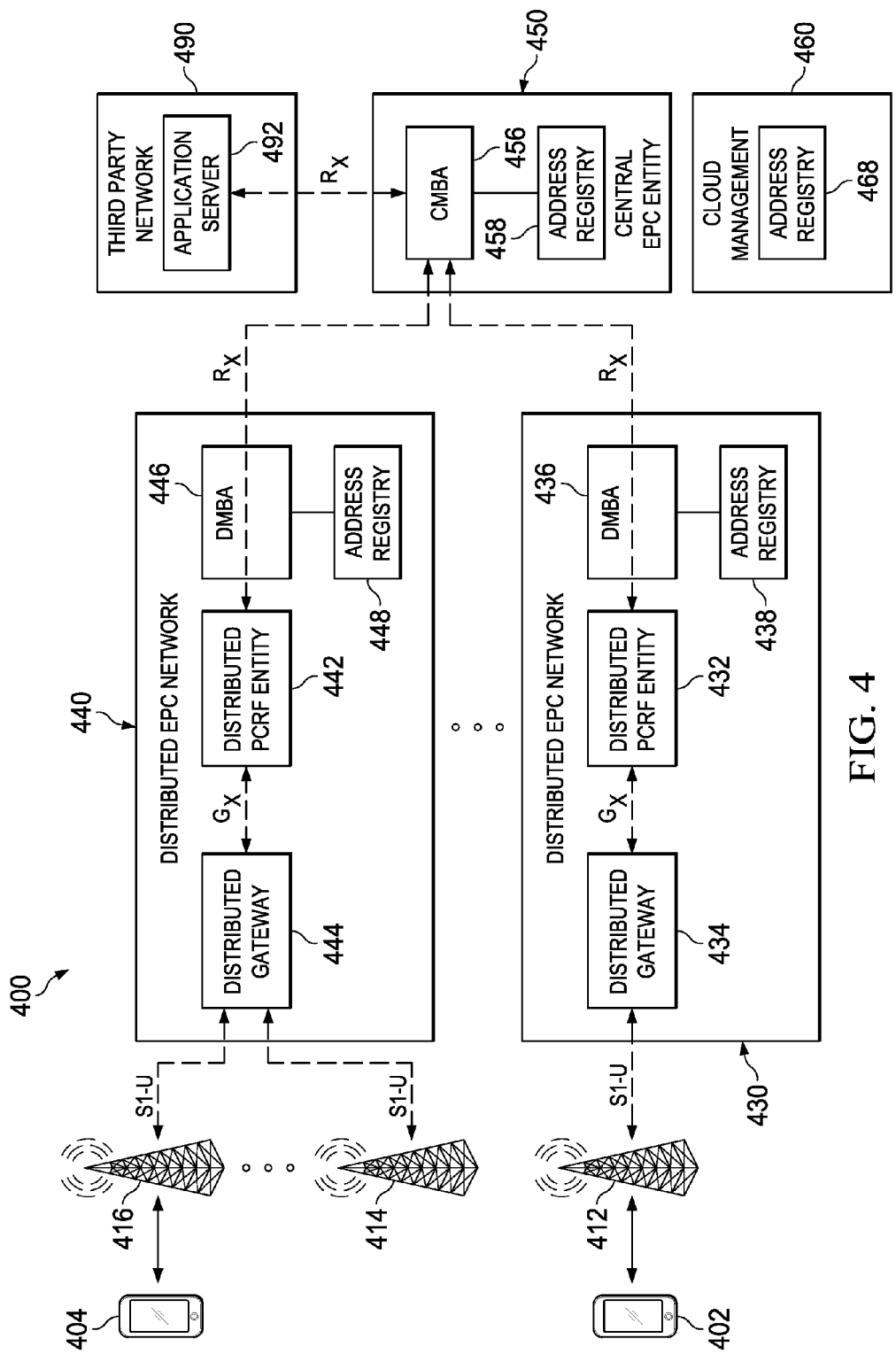
FIG. 4 illustrates a diagram of an embodiment distributed EPC network architecture.

Aspects of this disclosure provide techniques that publish IP address assignments of distributed EPC networks to an IP address registry that is available to the central EPC entity, thereby allowing the central EPC entity to appropriately route AAA requests received from third party networks. FIG. 4 illustrates an embodiment distributed EPC network architecture 400 in which IP address assignments of distributed gateways 434, 444 are published into an address registry 458 in available to a central EPC entity 450. In one example, an IP address re-allocation occurs in which a range of IP addresses are allocated to the distributed gateway 444. This prompts the distributed PCRF entity 442 to initiate a publication to one or both of the address registries 458, 468. In one example, the distributed PCRF entity 442 directly publishes the address range allocation to the address registry 458 in the central EPC entity 450. In another example, the distributed PCRF entity 442 publishes the address range allocation to the address registry 468 in the cloud management entity 450, and the cloud management entity 450 subsequently updates the address registry 458 in the central EPC entity 450. At a later point in time, the UE 404 initiates establishment of a radio connection with an access point 416, prompting the distributed gateway 444 to assign an IP address from the pool of allocated addresses to the UE 404. Thereafter, the UE 404 attempts to access a service provided by the application server by sending an SIP request message to the third party network 490. The SIP request message carries the IP address assigned to the UE 404, and prompts the third party network 490 to send a AAA request to the central EPC network entity 450. The AAA request is adapted to elicit an authentication and/or authorization of the UE 404, and specifies the IP address assigned to the UE 404 as a destination address of the AAA request. The central EPC entity 450 references the address registry 458 to identify that the IP address specified by the AAA request is allocated to the distributed gateway 444 in the distributed EPC network 440, and, as a result, the central entity 450 forwards the AAA request to the distributed PCRF entity 442 in the distributed EPC network 440. The AAA request is then relayed to the UE 404. In some embodiments, the CMBA 456 and the DMBAs 436, 446 seamlessly relay the AAA requests between the central EPC network entity 450 and the distributed EPC networks 430, 440.

Figure 5:
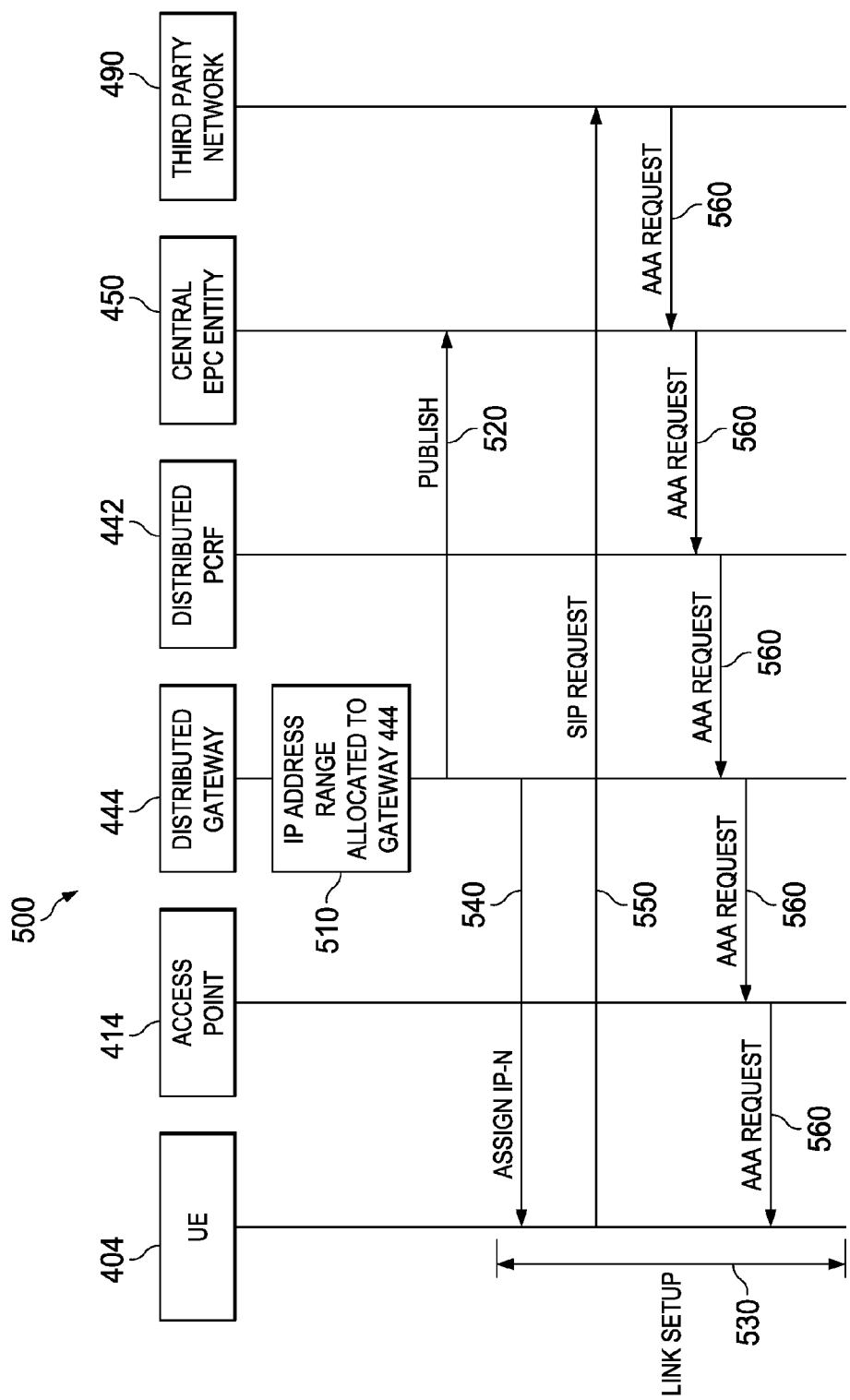
FIG. 5 illustrates a protocol diagram of an embodiment communications sequence for address registry publishing and AAA routing in the embodiment distributed EPC network architecture depicted in FIG. 4.

FIG. 5 illustrates a communications sequence 500 for address registry publishing and AAA routing in the embodiment distributed EPC network architecture 400. As shown, the communications sequence 500 begins with an address re-allocation procedure 510, in which an IP address range is allocated to the gateway 444. Address reallocation may allocate a range of addresses to a gateway for dynamic assignment. Thereafter, the address re-allocation 510 is published 520 to the address registry 458 available to the central EPC entity 450. The publication may be directly communicated from the PCRF entity 432 to the CMBA 456. Conversely, the publication may be indirectly communicated from the PCRF entity 432 to the cloud management server 460, and then from the could management server 460 to the CMBA 456. Thereafter, the UE 404 and access point 414 engage in a link setup 530, during which time the distributed gateway 444 performs an IP address assignment 540 to assign a specific IP address (IP-N) to the UE 404. Notably, the specific IP address (IP-N) is within the range of IP addresses allocated to the gateway 444 during the address re-allocation procedure 510. Next, the UE 404 sends an SIP request 550 to the third party network 490 to request a service provided by the application server 492. The SIP request 550 specifies the IP-N as a source address of the SIP request 550, and prompts the third party network 490 to send a AAA request 560 specifying the IP-N as a destination address of the AAA request 560 to the central entity 450 for the purpose of authenticating the UE 404.

The central EPC entity 450 will then reference the address registry 458 to determine that the IP-N is associated with the distributed EPC network 440 (or the distributed PCRF entity 442), and forward the AAA request 560 to the distributed PCRF entity 442. In some embodiments, the forwarding of the AAA request 560 may be facilitated by the CMBA 456 and the DMBA 446, which may be transparent to the third party network 490 and/or other participating entities/components. The AAA request 560 is then forwarded from the distributed PCRF to the UE 404 via the distributed gateway 444 and the access point 414.

Figure 6:
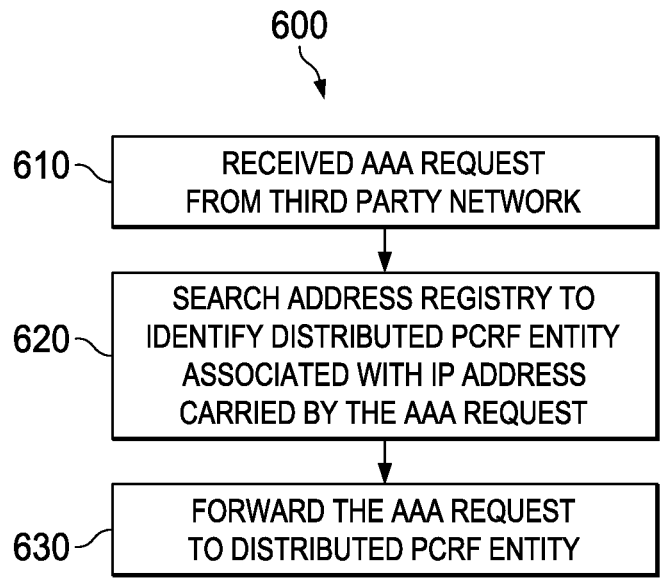
FIG. 6 illustrates a flowchart of an embodiment method for AAA routing in distributed EPC network architectures.

FIG. 6 illustrates a method 600 for routing AAA signaling between a third party network and distributed PCRF entities in distributed ECP networks, as may be performed by a central EPC network entity (e.g., a distribute message broker agent). As shown, the method 600 begins at step 610, where the central EPC network entity receives a AAA request from a third party network. The AAA request specifies a destination IP address of the AAA request. Subsequently, the method 600 proceeds to step 620, where the central EPC network entity searches an address registry to identify the distributed PPCRF entity associated with the IP address carried by the AAA request. Next, the method 600 proceeds to step 630, where the central EPC network entity forwards the AAA request to the distributed PCRF entity.

Another potential issue with distributed EPC network architectures is the latency in providing an authentication or authorization profile to the distributed PCRF during link setup. More specifically, the authentication or authorization profile is typically stored in a Subscription profile repository (SPR) maintained by the central EPC network entity, and is communicated to the distributed PCRF entity to allow the distributed EPC network to authenticate the UE. Generally speaking, UE authentication is required to be performed during link setup, and therefore latency in communicating the authentication or authorization profile may delay link setup.

In conventional networks, the SPR communicates the authentication or authorization profile to the distributed PCRF only after receiving a corresponding profile request message from the distributed PCRF. The profile request message specifies the International Mobile Subscriber Identity (IMSI) of the UE, and is traditionally communicated separately from (and after) the update location request (ULR) message. Thus, the time between communication of the ULR and profile request messages adds latency to authentication of the UE in distributed EPC networks, thereby delaying link setup.

Figure 7:
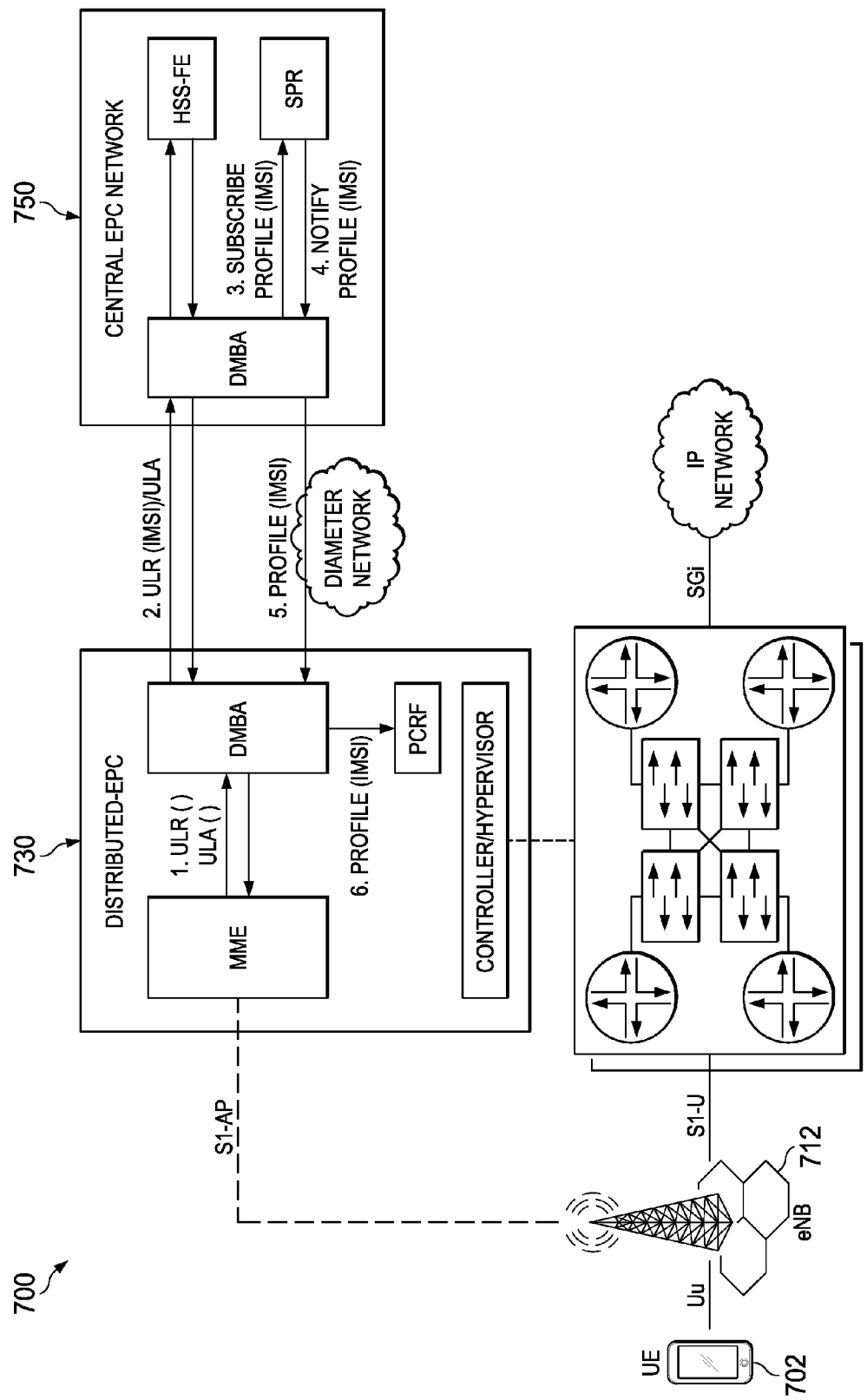
FIG. 7 illustrates a diagram of another embodiment EPC network architecture.

Aspects of this disclosure avoid this latency by triggering communication of the authentication or authorization profile based on the URL message. FIG. 7 illustrates an embodiment distributed EPC network architecture 700 in which an authentication or authorization profile is triggered by a ULR message. As shown, the UE 702 connects to the AP 712, which prompts an MME in the distributed EPC network 730 to send an update location request (ULR) or update location answer (ULA) message to the central EPC network 750. The ULR/ULA message triggers communication of the authentication profile message from the central EPC network 750 to the distributed EPC network 730 without a profile request message being communicated from the distributed EPC network 730 to the central EPC network 730. In some embodiments, this is facilitated by a DMBA in the central EPC network 730, which submits a request to the SPR upon receiving the ULR message.

Notably, the DMBA can broker and cache subscriber information seamlessly. When a user attaches to the network, S6a signaling between the mobility management entity (MME) and HSS (steps 1, 2) is brokered via the DMBA. The DMBA subscribes to the UE's profile (step 3). The SPR notifies the DMBA with the UE profile (step 4) and the DMBA delivers this UE profile to PCRF (steps 5, 6). If there is any update in the UE profile, the SPR notifies the DMBA and steps 4, 5, 6 are repeated until the session terminates.

Figure 8:
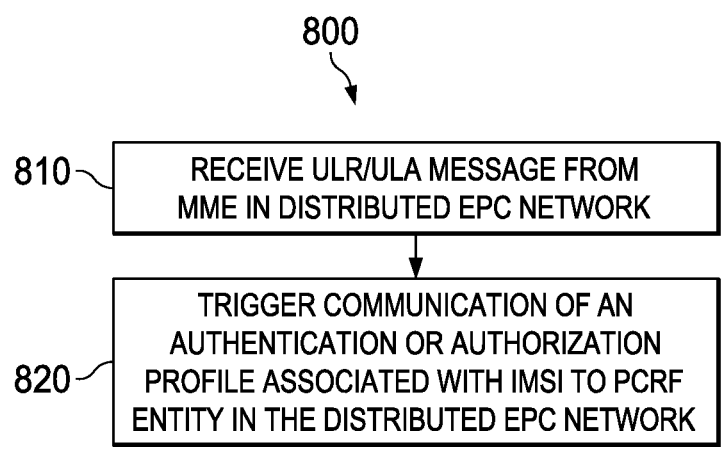
FIG. 8 illustrates a flowchart of an embodiment method for triggering communication of an authentication profile based on an update location request (ULR) message.

FIG. 8 illustrates a method 800 for triggering communication of the authentication or authorization profile based on the URL message, as may be performed by a central EPC network entity (e.g., a distribute message broker agent). As shown, the method 800 begins at step 810, where the central EPC network entity receives a ULR/ULA message from a distributed EPC network entity, e.g., an MME in a distributed EPC network. Subsequently, the method 800 proceeds to step 820, where the central EPC network entity triggers communication of an authentication profile message to the distributed EPC network by virtue of receiving the ULR message, and without receiving a separate profile request message from the distributed EPC network.

Figure 9:
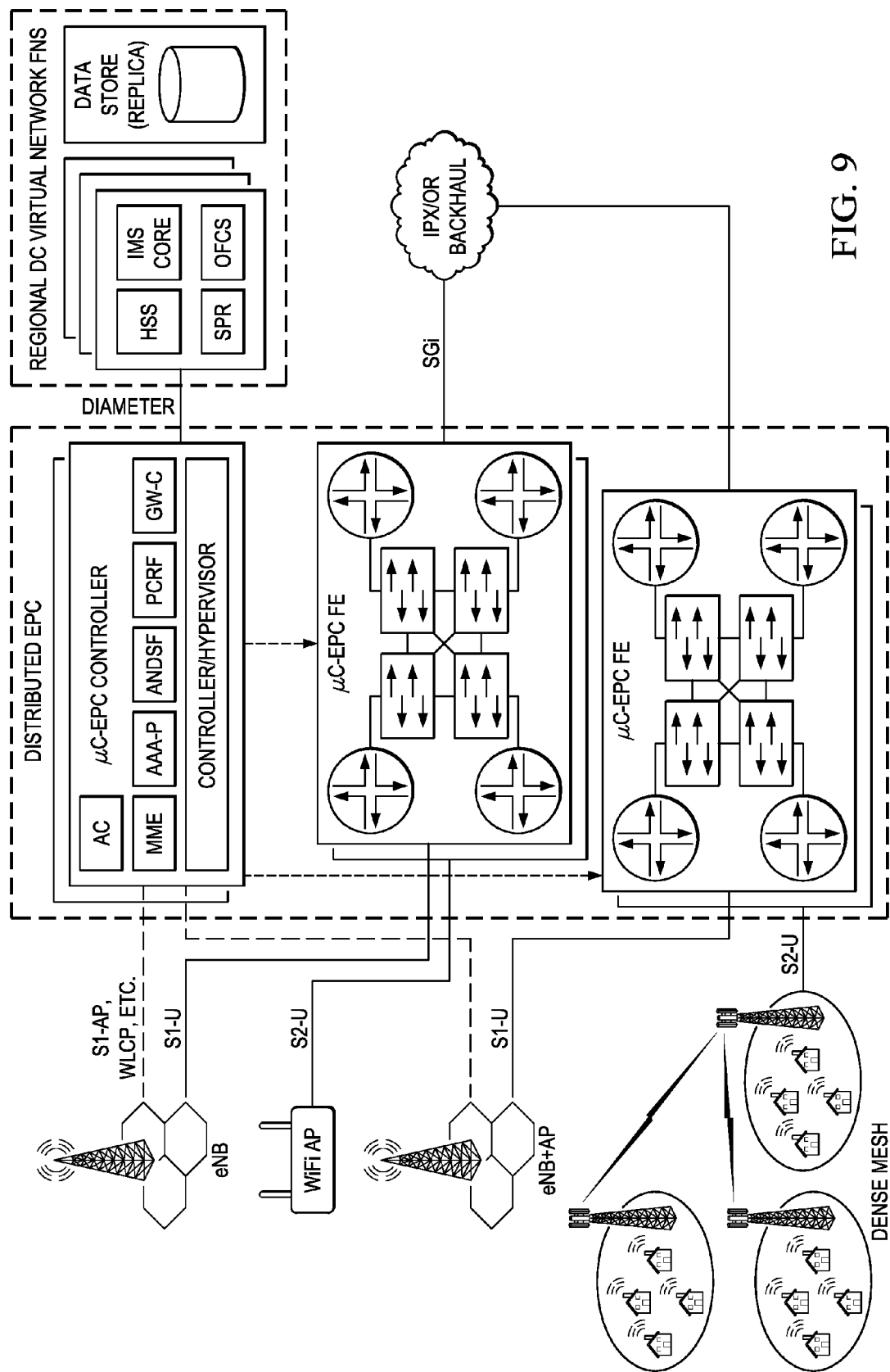
FIG. 9 illustrates a diagram of another embodiment distributed EPC network architecture.

FIG. 9 illustrates a distributed EPC architecture, where functionality for handling sessions is hosted on virtual machines (VMs) in the distributed EPC. Other functions such as home subscriber service (HSS) and subscription profile repository (SPR) are located in a central cloud/data center (DC). Due to such a distribution, session handling is optimal for many cases. However, some signaling needs further mechanisms to operate seamlessly.

An embodiment enhances existing distributed EPC mechanisms and includes brokering and caching of authentication, authorization, and accounting (AAA) protocol (e.g., Diameter) messages and subscriber information.

Figure 10:
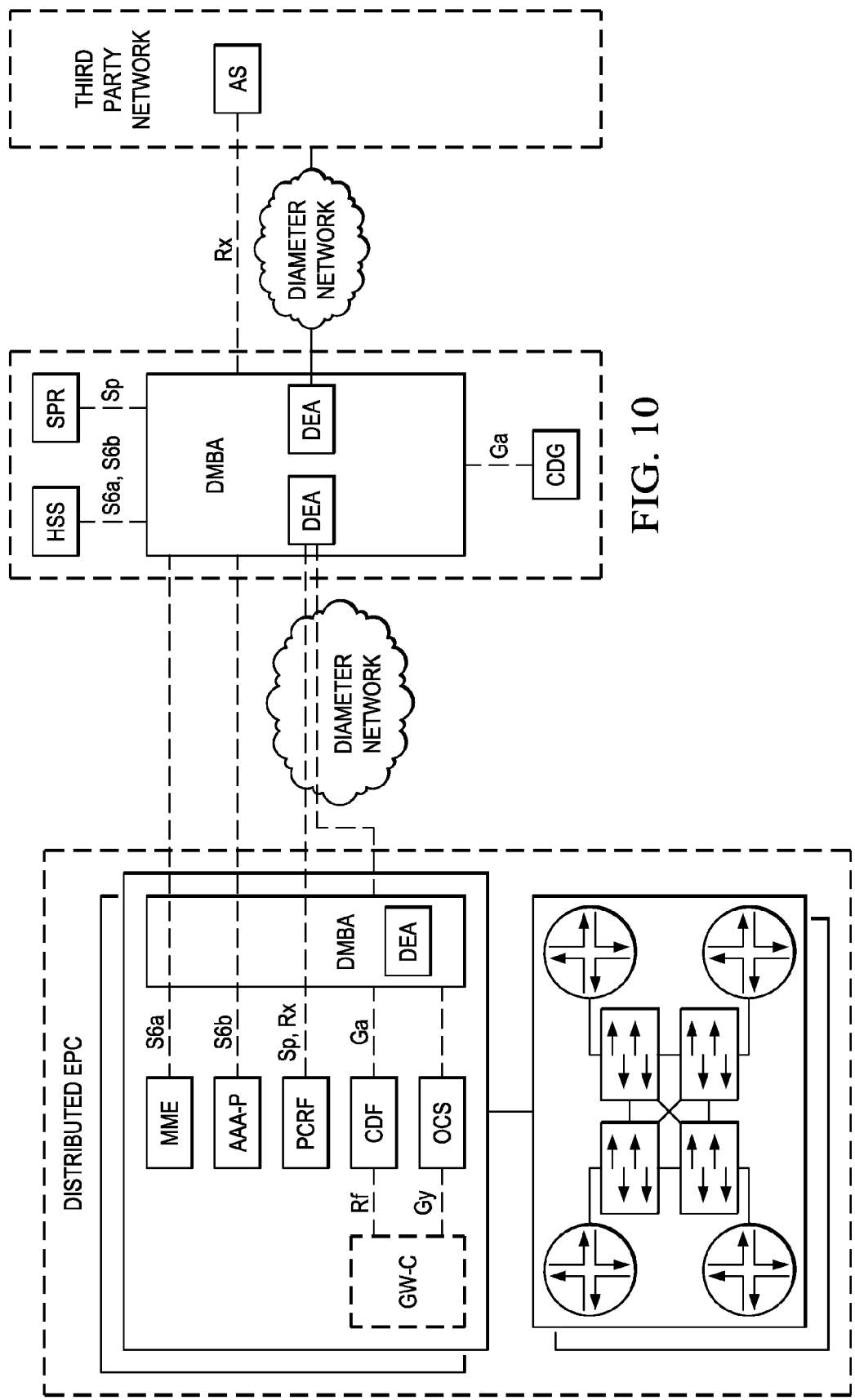
FIG. 10 illustrates a diagram of an embodiment distributed message brokering agent.

FIG. 10 illustrates an embodiment signaling broker distributed message brokering agent (DMBA). The DMBA brokers AAA, e.g., Diameter requests from various distributed EPC entities to the servers (online charging system (OCS), CDG, HSS, etc.) in the central DC.

An embodiment DMBA manages security associations similar to a Diameter edge agent (DEA) and supports mechanisms for handling requests from an external network (application server (AS)→Rx→PCRF). In these cases, the DMBA locates the right PCRF that is serving the UE. The DMBA also is used to optimize the download of a user profile to PCRF, OCS when the user attaches to the network.

Figure 11:
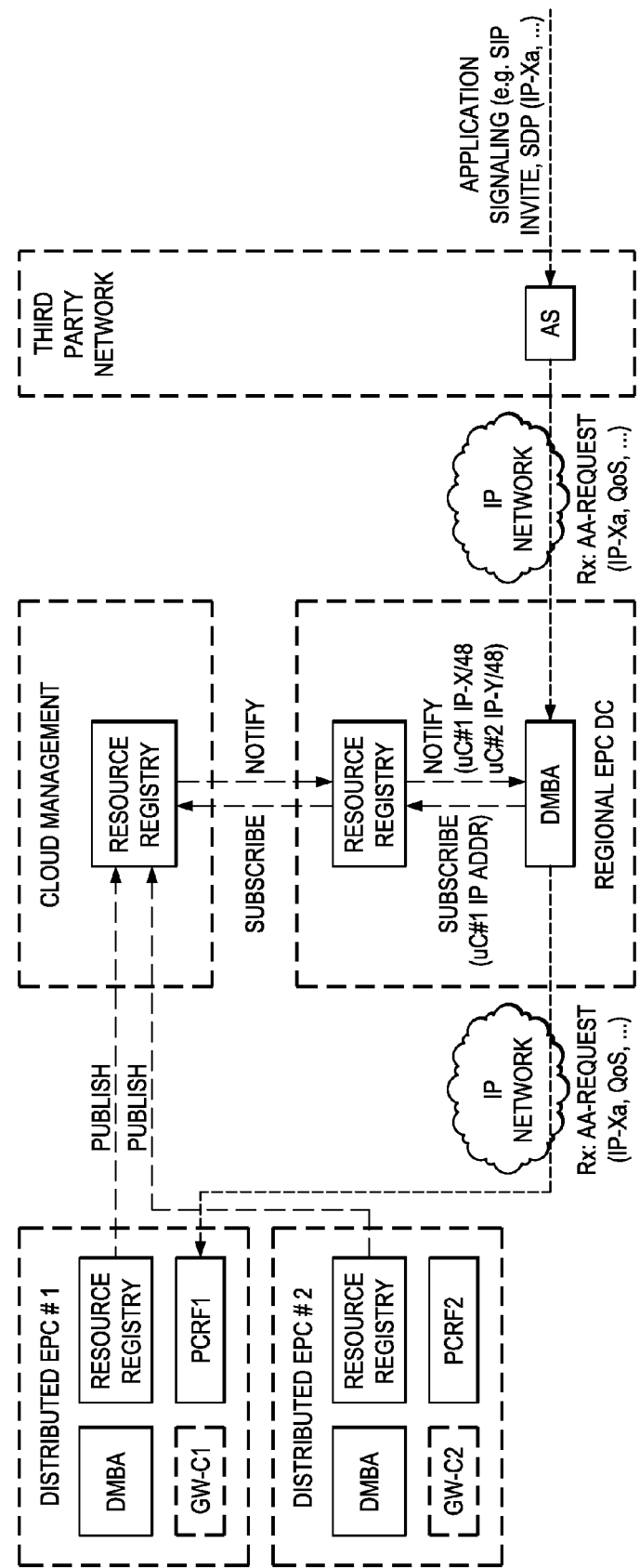
FIG. 11 illustrates a diagram of an embodiment PCRF discovery protocol in a distributed EPC architecture.

FIG. 11 illustrates PCRF discovery in a distributed EPC architecture. When a UE obtains service from a third party network (TPN) that has a quality of service (QoS)/service level agreement (SLA) relationship with the UE's operator, the TPN server (AS) may request for QoS for the flow. The extensions to support this in a distributed EPC are described below.

The cloud management entities—in this case the resource registry—of the distributed locations sync up on resources including Internet protocol (IP) address/prefix range associated with packet gateway (PGW) access point name (APN)/address assignments. The DMBA in each location subscribes to information on IP address ranges, associated PCRF as shown in FIG. 3.

When an Rx interface request (e.g., AA Request) from an AS arrives, the DMBA consults its table and maps the IP address/prefix in the request to the information of distributed EPC locations. The DMBA then proxies the request to the right PCRF (PCRF1 in FIG. 3).

Figure 12:
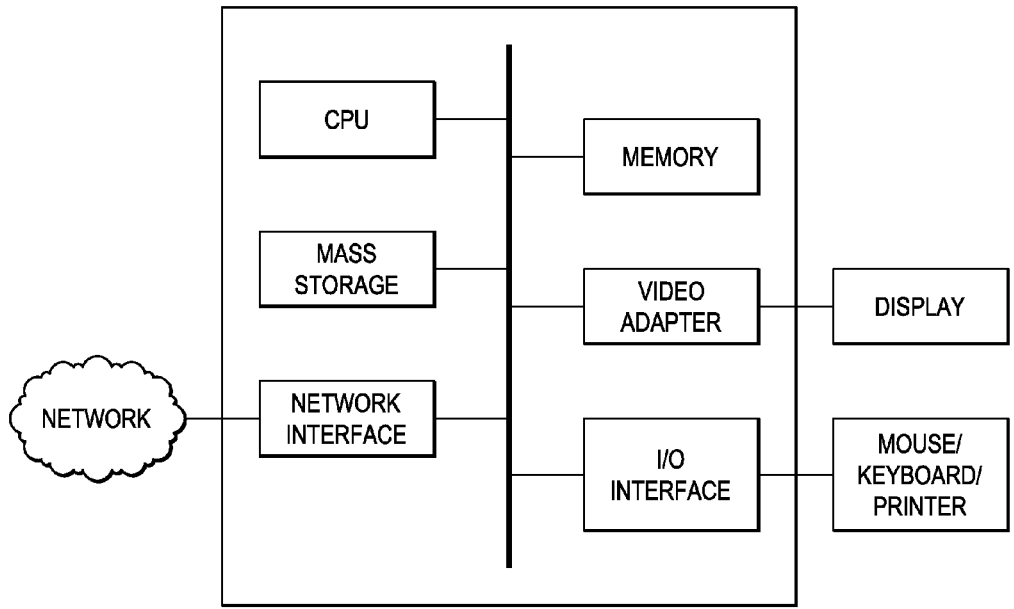
FIG. 12 illustrates a diagram of an embodiment computing platform.

FIG. 12 illustrates OCS in a distributed EPC to optimize dynamic charging. Similar to the mechanism for PCRF, the DMBA can download the user profile to OCS. If the subscription profile for DMBA includes an online charging parameter/flag, the DMBA downloads the UE profile to OCS (steps 4, 5, 6). If there is any update in the UE profile, the SPR notifies the DMBA and steps 4, 5, 6 are repeated until the session terminates.

An embodiment distributed signaling brokering agent allows the various distributed functions to discover and message seamlessly. An embodiment mechanism for the brokering agent routes requests from outside the operator network (e.g., AS, PCRF and Rx signaling). An embodiment mechanism optimizes the download of the subscriber profile to the distributed PCRF and OCS entities. Embodiments may be implemented in packet core networks and devices, such as 3GPP evolved packet core networks and devices, and the like.

Figure 13:
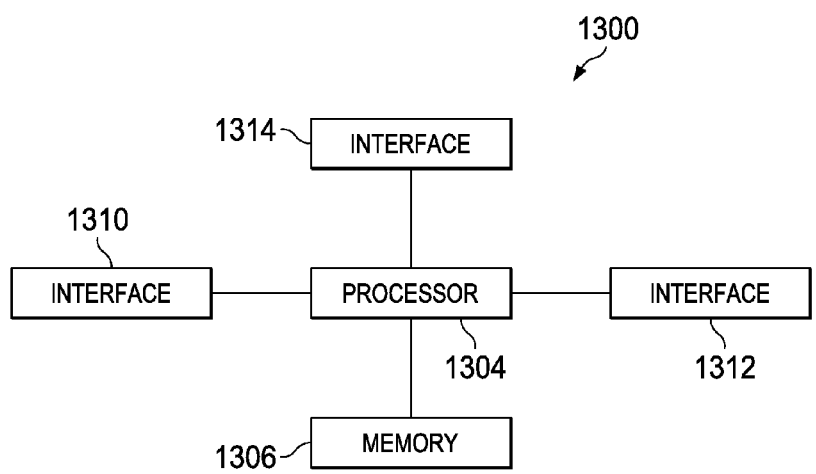
FIG. 13 illustrates a diagram of an embodiment communications device.

FIG. 13 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), readonly memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

The following references are related to subject matter of the present application. Each of these references is incorporated herein by reference in its entirety:

3GPP TS 23.401 version 12.2.0, 3rd Generation Partnership Project, Technical Specification Group Services and System Aspects, General Packet Radio Service (GPRS) enhancements for Evolved Universal Terrestrial Radio Access Network (E-UTRAN) access (Release 12) (September, 2013).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for reserving resources in distributed evolved packet core (EPC) networks, the method comprising:
    publishing, at a brokering agent in a central EPC network, an address registry for internet protocol (IP) address assignments for a plurality of distributed EPC networks, wherein ranges of the IP address assignments correspond to at least one pool of addresses available for assignment by distributed gateways;
    receiving, by the brokering agent in the central EPC network, an authentication, authorization, and accounting (AAA) protocol request from an application server, the AAA protocol request specifying an IP address as a destination address of the AAA protocol request, wherein the IP address is assigned to a user equipment (UE);
    searching, by the brokering agent, the address registry in accordance with the IP address to determine that the IP address is associated with a first one of the plurality of distributed EPC networks, wherein the brokering agent serves as an intermediary between the plurality of distributed EPC networks and the application server, and wherein each of the plurality of distributed EPC networks serves as an intermediary between the central EPC network and one or more radio access networks (RANs); and
    forwarding, by the brokering agent, the AAA protocol request to a distributed policy and charging rules function (PCRF) entity in a first distributed EPC network.

2. The method of claim 1, wherein the PCRF entity is hosted by a first data center that excludes the brokering agent.

3. The method of claim 1, wherein the IP address is assigned to the UE by a gateway hosted by a first data center, and wherein the brokering agent is hosted by a second data center that is separate and distinct from the first data center.

4. The method of claim 3, wherein the address registry is a data base entry that is shared by the first data center and the second data center.

5. The method of claim 4, wherein the gateway is adapted to publish address updates to a local version of the address registry stored in the first data center, and wherein publishing updates to the local version of the address registry stored in the first data center triggers an automatic update to a remote version of the address registry stored in the second data center.

6. The method of claim 3, wherein the address registry is a local copy of a master address registry, the master address registry being maintained by a cloud management server, and the local copy of the master address registry being cached by the second data center.

7. A server comprising:
    a processor; and
    a non-transitory computer readable storage medium storing programming for execution by the processor, the programming including instructions to:
        publish, at a brokering agent in a central evolved packet core (EPC) network, an address registry for internet protocol (IP) address assignments for a plurality of distributed EPC networks, wherein ranges of the IP address assignments correspond to at least one pool of addresses available for assignment by distributed gateways;
        receive an authentication, authorization, and accounting (AAA) protocol request from an application server, the AAA protocol request specifying an IP address as a destination address of the AAA protocol request, wherein the server hosts the brokering agent in the central EPC network, and wherein the IP address is assigned to a user equipment (UE);
        search the address registry in accordance with the IP address to determine that the IP address is associated with a distributed policy and charging rules function (PCRF) entity in a first one of the plurality of distributed EPC networks, wherein the brokering agent serves as an intermediary between the plurality of distributed EPC networks and the application server, and wherein each of the plurality of distributed EPC networks serves as an intermediary between the central EPC network and one or more radio access networks (RANs); and
        forward the AAA protocol request to the PCRF entity in a first distributed EPC network.

8. The server of claim 7, wherein the PCRF entity is hosted by a first data center that excludes the brokering agent.

9. The server of claim 7, wherein the IP address is assigned to the UE by a gateway hosted by a first data center, the first data center excluding the server.

10. The server of claim 9, wherein the gateway is adapted to publish address updates to a local version of the address registry stored in the first data center, and wherein publishing updates to the local version of the address registry stored in the first data center triggers an automatic update to a remote version of the address registry stored in a second data center.

11. The server of claim 10, wherein the gateway is adapted to remotely publish address updates to the address registry via a wide area network (WAN) interface extending between a cloud management server and the first data center.

12. The server of claim 10, wherein the address registry is a local copy of a master address registry, the master address registry being maintained by a cloud management server, and the local copy of the master address registry being cached by a second data center housing the server.

13. A method for fast authentication in distributed evolved packet core (EPC) networks, the method comprising:
receiving, by a brokering agent in a central EPC network, an update location request/update location answer (ULR/ULA) message from a mobility management entity (MME) in a distributed EPC network, the ULR/ULA message specifying an international mobile subscriber identity (IMSI) of a user equipment (UE), wherein the brokering agent serves as an intermediary between the distributed EPC network and external networks, and wherein the distributed EPC network serves as an intermediary between the central EPC network and one or more radio access networks (RANs); and
triggering communication of an authentication or authorization profile associated with the IMSI from the brokering agent of the central EPC network to a distributed policy and charging rules function (PCRF) entity in the distributed EPC network in response to receiving the ULR/ULA message from the MME, by accessing, by the brokering agent, the authentication or authorization profile in a subscription profile repository (SPR) maintained by the central EPC network, the authentication or authorization profile being sent to the distributed PCRF entity without receiving a corresponding profile request from the distributed PCRF entity.

14. The method of claim 13, wherein the PCRF entity is hosted by a first data center that excludes the brokering agent.

15. The method of claim 13, wherein the ULR/ULA message comprises a diameter update location request (ULR) message.

16. The method of claim 13, wherein the ULR/ULA message comprises a diameter update location answer (ULA) message.

17. A brokering agent in a central evolved packet core (EPC) network, comprising:
a processor; and
a non-transitory computer readable storage medium storing programming for execution by the processor, the programming including instructions to:
receive an update location request/update location answer (ULR/ULA) message from a mobility management entity (MME) in a distributed EPC network, wherein the ULR/ULA message specifies an international mobile subscriber identity (IMSI) of a user equipment (UE), wherein the brokering agent serves as an intermediary between the distributed EPC network and external networks, and wherein the distributed EPC network serves as an intermediary between the central EPC network and one or more radio access networks (RANs); and
send an authentication or authorization profile associated with IMSI to a distributed policy and charging rules function (PCRF) entity in the distributed EPC network in response to receiving the ULR/ULA message from the MME, by accessing, by the brokering agent, the authentication or authorization profile in a subscription profile repository (SPR) maintained by the central EPC network, the authentication or authorization profile being sent to the distributed PCRF entity.

18. The brokering agent of claim 17, wherein the PCRF entity is hosted by a first data center that excludes the brokering agent.

19. The brokering agent of claim 17, wherein the ULR/ULA message comprises a diameter update location request (ULR) message.

20. The brokering agent of claim 17, wherein the ULR/ULA message comprises a diameter update location answer (ULA) message.

* * * * *